(12) United States Patent
Lee

(10) Patent No.: US 7,676,982 B1
(45) Date of Patent: Mar. 16, 2010

(54) METHOD AND APPARATUS FOR VENTING FISH

(76) Inventor: San Fu Lee, 3922 W. Osborne Ave., Tampa, FL (US) 33614-6551

( * ) Notice: Subject to any disclaimer, the term of this patent is extended or adjusted under 35 U.S.C. 154(b) by 135 days.

(21) Appl. No.: 12/051,410

(22) Filed: Mar. 19, 2008

(51) Int. Cl.
*A01K 97/18* (2006.01)
*A01K 97/00* (2006.01)

(52) U.S. Cl. .............. 43/4; 43/53.5; 604/272; 604/239; 604/192; 7/106; 7/118

(58) Field of Classification Search .............. 43/4, 43/53.5, 43.12; 604/272, 239, 181, 182, 604/192, 199; 157/13; 30/366; 83/866; 7/118, 106
See application file for complete search history.

(56) References Cited

U.S. PATENT DOCUMENTS

| | | | | |
|---|---|---|---|---|
| 80,756 A | * | 8/1868 | Miller | 7/118 |
| 297,375 A | * | 4/1884 | Freund | 7/118 |
| 358,312 A | * | 2/1887 | Weck | 7/118 |
| 430,299 A | * | 6/1890 | Rand | 30/366 |
| 444,094 A | * | 1/1891 | Drabble | 7/118 |
| 445,380 A | * | 1/1891 | Philip | 30/366 |
| 573,475 A | * | 12/1896 | Muller | 7/118 |
| 578,043 A | * | 3/1897 | Pascoe | 7/106 |
| 580,235 A | * | 4/1897 | Strum | 7/118 |
| 613,698 A | * | 11/1898 | Martin | 7/118 |
| 653,807 A | * | 7/1900 | Hofstetter | 7/118 |
| 787,064 A | * | 4/1905 | Welter | 30/366 |
| 824,867 A | * | 7/1906 | Houghton | 30/366 |
| 837,370 A | * | 12/1906 | Yeaton | 7/118 |
| 883,648 A | * | 3/1908 | Landers | 7/118 |
| 987,355 A | * | 3/1911 | Godwin | 30/366 |
| 1,150,387 A | * | 8/1915 | Roberts | 604/274 |
| 1,259,335 A | * | 3/1918 | Acton | 30/366 |
| 1,475,301 A | * | 11/1923 | Hartleb | 7/106 |
| 1,485,253 A | * | 2/1924 | Devlin | 30/366 |
| 1,825,077 A | * | 9/1931 | Lawrence | 30/140 |
| 2,050,194 A | * | 8/1936 | Pflueger | 43/53.5 |
| 2,370,958 A | * | 3/1945 | Hellier | 156/87 |
| 2,414,911 A | * | 1/1947 | Temple | 222/81 |
| 2,571,590 A | * | 10/1951 | Logic | 222/86 |
| 2,749,653 A | * | 6/1956 | Patrowsky et al. | 43/53.5 |
| 2,786,528 A | * | 3/1957 | Wick | 30/366 |
| 2,929,432 A | * | 3/1960 | Funk et al. | 152/415 |
| RE24,902 E | * | 12/1960 | Dillard | 43/53.5 |
| 3,050,896 A | * | 8/1962 | Parker | 43/53.5 |
| 3,076,457 A | * | 2/1963 | Copen | 604/272 |
| 3,154,985 A | * | 11/1964 | Hermanns | 83/868 |
| 3,277,893 A | * | 10/1966 | Clark | 604/130 |
| 3,349,821 A | * | 10/1967 | Moeller | 30/366 |

(Continued)

*Primary Examiner*—Darren W Ark
(74) *Attorney, Agent, or Firm*—Ronald E. Smith; Smith & Hopen, P.A.

(57) ABSTRACT

A tool for saving the lives of captured fish that are swollen by expanded gases when brought to the surface includes an elongate hollow tube of rigid construction having a sharp cutting edge formed in a distal free end of the tube. A user grasps a proximal end of the tube and punctures a fish at a predetermined location in its body with the sharp cutting edge to allow gases to flow out of the body of the fish until the body returns to a substantially unswollen condition. The fish is conventionally resuscitated prior to release after the gases have been vented. The tube folds into a handle for storage when not in use.

8 Claims, 5 Drawing Sheets

U.S. PATENT DOCUMENTS

| | | | | |
|---|---|---|---|---|
| 3,352,013 | A * | 11/1967 | Fuller et al. | 30/368 |
| 3,382,577 | A * | 5/1968 | Rieder | 30/366 |
| 3,395,704 | A * | 8/1968 | Frey et al. | 30/366 |
| 3,403,466 | A * | 10/1968 | Young | 43/4 |
| 3,419,924 | A * | 1/1969 | Archibald | 43/53.5 |
| 3,448,520 | A * | 6/1969 | Fuller et al. | 30/366 |
| 3,797,112 | A * | 3/1974 | Paulson | 30/366 |
| 3,825,961 | A * | 7/1974 | Klein | 7/106 |
| 4,073,083 | A * | 2/1978 | Davis | 43/4 |
| 4,118,881 | A * | 10/1978 | McFarlane | 43/4 |
| 4,127,957 | A * | 12/1978 | Bourquin et al. | 43/53.5 |
| 4,129,955 | A * | 12/1978 | Schommer | 43/4 |
| 4,403,797 | A * | 9/1983 | Ragland, Jr. | 43/4 |
| 4,590,702 | A * | 5/1986 | Chestnutt | 43/53.5 |
| 4,674,220 | A * | 6/1987 | Bearce et al. | 43/4 |
| 4,706,403 | A * | 11/1987 | Reynolds | 43/4 |
| 4,713,886 | A * | 12/1987 | Ikeda | 30/366 |
| 4,833,817 | A * | 5/1989 | Silverthorn | 43/53.5 |
| 4,914,853 | A * | 4/1990 | Swindle | 43/53.5 |
| 4,915,631 | A * | 4/1990 | Robinson et al. | 43/4 |
| 5,099,579 | A * | 3/1992 | Chadwick | 30/366 |
| 5,119,585 | A * | 6/1992 | Camp | 43/53.5 |
| 5,136,744 | A * | 8/1992 | Allsop et al. | 43/4 |
| 5,250,066 | A * | 10/1993 | Lambert | 604/272 |
| 5,259,399 | A * | 11/1993 | Brown | 604/909 |
| 5,274,948 | A * | 1/1994 | Harrison et al. | 43/53.5 |
| 5,283,920 | A * | 2/1994 | Plummer | 43/4 |
| 5,307,586 | A * | 5/1994 | Palmer | 43/53.5 |
| 5,548,917 | A * | 8/1996 | Holwadel | 43/1 |
| 5,557,874 | A * | 9/1996 | Pietrandrea et al. | 43/4 |
| 5,581,834 | A * | 12/1996 | Collins | 7/118 |
| 5,600,914 | A * | 2/1997 | Tatar | 43/4 |
| 5,784,830 | A * | 7/1998 | Brumfield | 43/53.5 |
| 5,967,012 | A * | 10/1999 | Dummer et al. | 83/451 |
| 5,983,555 | A * | 11/1999 | Biel | 43/53.5 |
| 6,026,607 | A * | 2/2000 | Bukowski | 43/53.5 |
| 6,038,808 | A * | 3/2000 | Bergeron et al. | 43/53.5 |
| 6,065,238 | A * | 5/2000 | Carter et al. | 43/4 |
| 6,182,541 | B1 * | 2/2001 | Anderson et al. | 7/118 |
| 6,205,698 | B1 * | 3/2001 | Richards | 43/53.5 |
| 6,223,441 | B1 * | 5/2001 | Parsons | 30/366 |
| 6,305,118 | B1 * | 10/2001 | Wacha | 43/4 |
| 6,393,756 | B1 * | 5/2002 | Forney et al. | 43/42.06 |
| 6,397,513 | B1 * | 6/2002 | Reed | 43/53.5 |
| 6,421,949 | B1 * | 7/2002 | Schytte | 43/43.12 |
| 6,434,878 | B1 * | 8/2002 | Milton | 43/4 |
| 6,550,177 | B1 * | 4/2003 | Epple, Jr. | 43/4 |
| 6,560,913 | B1 * | 5/2003 | Liao | 43/53.5 |
| 6,625,920 | B1 * | 9/2003 | Rockwell | 43/4 |
| 6,676,638 | B2 * | 1/2004 | Takagi et al. | 604/192 |
| 6,679,199 | B2 * | 1/2004 | Bankston | 43/4 |
| 6,681,513 | B2 * | 1/2004 | Hill | 43/4 |
| 6,715,804 | B2 * | 4/2004 | Beers | 43/4 |
| 6,769,212 | B2 * | 8/2004 | Grayson | 43/4 |
| 6,802,094 | B2 * | 10/2004 | Seber et al. | 7/118 |
| 6,846,302 | B2 * | 1/2005 | Shemesh et al. | 604/192 |
| 6,880,252 | B1 * | 4/2005 | Drake | 30/366 |
| 6,884,237 | B2 * | 4/2005 | Asbaghi | 604/192 |
| 6,898,891 | B1 * | 5/2005 | Needham | 43/4 |
| 6,926,696 | B2 * | 8/2005 | Mohammed | 604/272 |
| 7,076,910 | B1 * | 7/2006 | Xifra | 43/4 |
| 7,080,423 | B2 * | 7/2006 | Seber et al. | 7/118 |
| 7,127,922 | B2 * | 10/2006 | Khounsombath et al. | 7/118 |
| 7,146,667 | B2 * | 12/2006 | Elsener | 7/118 |
| 7,223,259 | B2 * | 5/2007 | Marshall et al. | 604/198 |
| 7,296,354 | B2 * | 11/2007 | Van Deursen et al. | 7/118 |
| 7,325,312 | B1 * | 2/2008 | Janich | 7/118 |
| 7,393,344 | B2 * | 7/2008 | Mohammed | 604/272 |
| 7,407,492 | B2 * | 8/2008 | Gurtner | 604/181 |
| 7,412,914 | B2 * | 8/2008 | Al-Majed | 30/366 |
| 7,434,350 | B1 * | 10/2008 | Gomez et al. | 43/53.5 |
| 7,444,779 | B2 * | 11/2008 | Hei | 43/53.5 |
| 7,478,497 | B2 * | 1/2009 | Otsuka et al. | 43/4 |
| 7,481,137 | B1 * | 1/2009 | Johnson | 7/118 |
| 2001/0016713 | A1 * | 8/2001 | Takagi et al. | 604/192 |
| 2002/0004652 | A1 * | 1/2002 | Asbaghi | 604/192 |
| 2002/0017048 | A1 * | 2/2002 | Lam | 43/4 |
| 2002/0082560 | A1 * | 6/2002 | Yang | 604/181 |
| 2002/0082564 | A1 * | 6/2002 | Pham | 604/192 |
| 2003/0029075 | A1 * | 2/2003 | Hebard | 43/53.5 |
| 2003/0163091 | A1 * | 8/2003 | Bush et al. | 604/181 |
| 2004/0025408 | A1 * | 2/2004 | Newman, Sr. | 43/53.5 |
| 2005/0105286 | A1 * | 5/2005 | Dallas et al. | 7/118 |
| 2006/0195062 | A1 * | 8/2006 | Gremel | 604/192 |
| 2007/0078403 | A1 * | 4/2007 | Millerd | 604/192 |
| 2007/0089355 | A1 * | 4/2007 | Burgett | 43/53.5 |
| 2007/0173772 | A1 * | 7/2007 | Liversidge | 604/192 |
| 2007/0199229 | A1 * | 8/2007 | Carder et al. | 43/4 |
| 2008/0110077 | A1 * | 5/2008 | Callaway | 43/4.5 |
| 2008/0154217 | A1 * | 6/2008 | Carrez et al. | 604/272 |
| 2008/0177235 | A1 * | 7/2008 | DiBiasi | 604/192 |
| 2008/0236019 | A1 * | 10/2008 | Gollahon | 43/4 |
| 2008/0301998 | A1 * | 12/2008 | Gallo | 43/53.5 |
| 2009/0025273 | A1 * | 1/2009 | Gauger | 43/53.5 |
| 2009/0069751 | A1 * | 3/2009 | Curtis et al. | 604/272 |
| 2009/0105661 | A1 * | 4/2009 | Chevallier et al. | 604/192 |
| 2009/0149836 | A1 | 6/2009 | Teachout et al. | 604/540 |

* cited by examiner

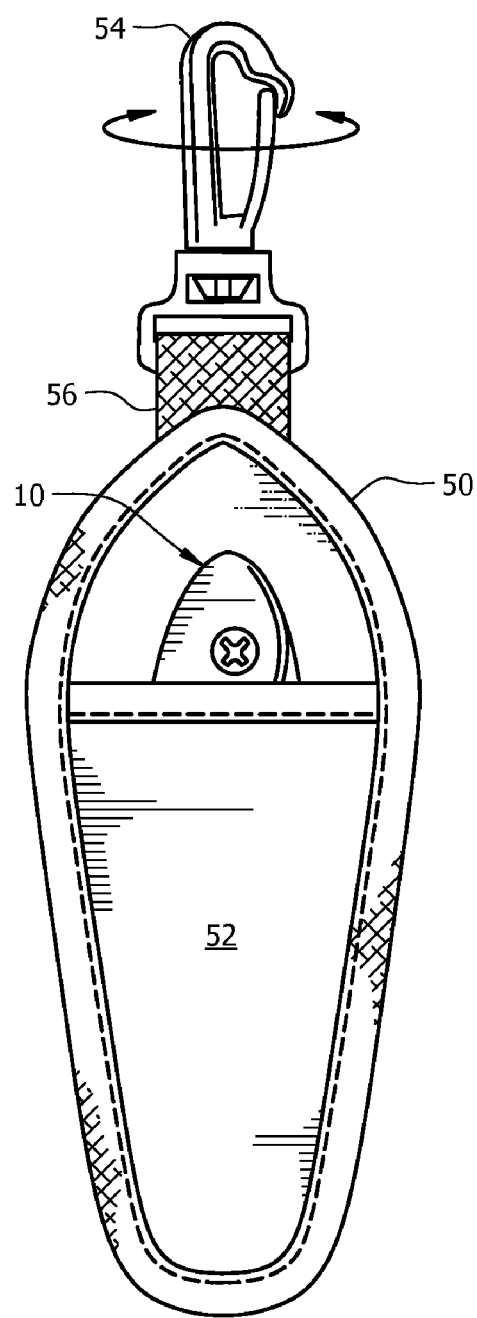 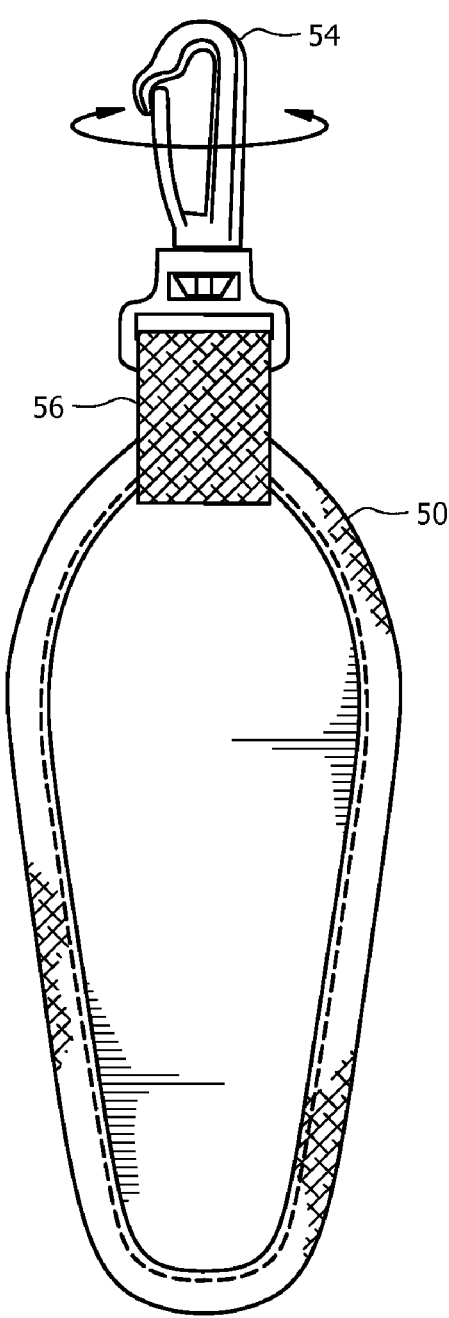
FIG. 7
FIG. 8

METHOD AND APPARATUS FOR VENTING FISH

FIELD OF THE INVENTION

This invention relates, generally, to the fishing industry. More particularly, it relates to a method and apparatus that enables survival of fish that are caught and released.

DESCRIPTION OF THE PRIOR ART

Many fish that are caught and found to be protected by law are released as required by law. A fish may be protected because its length is below a legal limit, because it belongs to a protected species, or for other reasons.

Even if a fish is not protected by law, the fisherman or fisherwoman may desire to return the fish to its environment for environmental reasons. However, if a fish is released without treatment of any kind, its survival chances are low. Many fishermen have learned to hold onto a fish as they return it to the water, and to move the fish forwardly and rearwardly to cause water to flow over its gills until the fish revives from the shock of being caught and swims away under its own propulsion.

This technique works for fish that are otherwise healthy. However, when a deep-dwelling fish is brought to the surface, it will be bloated, i.e., swollen because external pressure on the fish at its normal living depth is much less than the pressure on the fish when it is brought to the surface and into the atmosphere. Accordingly, the gases within the fish expand. The eyes of the fish will bulge out and in some cases the stomach of the fish will extend from its mouth.

Moving such a fish back and forth near the water surface in an effort to revive it is fruitless.

There is a need, then, for a treatment method that can enable such fish to survive.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for a device that saves the lives of deep-dwelling fish that have been brought to the surface is now met by a new, useful, and non-obvious invention.

The inventive structure is a novel tool for saving the lives of captured fish that are swollen by expanded gases when brought to the surface. It includes an elongate hollow tube of rigid construction having a proximal and a distal end and a sharp cutting edge formed in the distal end.

A user grasps the proximal end of the tube and punctures a fish at a predetermined location in its body with the sharp cutting edge until said body returns to a substantially unswollen condition. The fish is resuscitated by a conventional method after the gases have been vented and before being released.

The sharp cutting edge is formed by a bevel formed in the distal end of said tube.

The proximal end of the tube is secured to a handle to facilitate handling of the tube. The handle includes a first part and a second part that confront and abut one another, defining a hollow space between them for receiving the tube when the tube is in its stored configuration.

A pivot pin extends between the first and second parts of the handle at the leading end of the handle and said tube having a bore formed in its proximal end to receive said pivot pin. The tube has a fully deployed position when fully pivoted in a first direction about the pivot pin and a stored position when fully pivoted about the pivot pin in a second direction opposite to the first direction.

The proximal end of the tube is enlarged with respect to a balance of the tube to structurally reinforce the proximal end. The pivot pin extends through the enlarged, structurally reinforced proximal end of the tube.

The second part of the handle has a dished area formed therein to expose a medial extent of the tube when the tube is in the folded, stored configuration so that it can be grasped by a finger or thumb of a user.

A first detent is formed in a trailing end of the handle; it extends into the hollow space between the first and second parts of the handle. The first detent overlies the tube when the tube is in its folded, stored configuration. The first detent is formed of a flexible and resilient material so that the tube transiently displaces the detent when the tube is displaced from its deployed configuration to its stored configuration and from its stored configuration to its deployed configuration. A second detent is formed in a leading end of the handle but in trailing relation to the pivot pin and supplements the function of the first detent. A third detent is formed in a leading end of the handle in leading relation to the pivot pin and also extends into the hollow space between the first and second parts of the handle. The third detent overlies the proximal end of the tube when the tube is in its deployed configuration. The third detent is also formed of a flexible and resilient material so that the tube transiently displaces the first and second detents when the tube is displaced from its deployed configuration to its stored configuration and from its stored configuration to its deployed configuration.

A carrying case holds the tool when the tube is in its folded, stored configuration. The carrying case includes a clip so that the carrying case can be attached to a belt or other item of clothing.

The primary object of this invention is to save the lives of fish that are swollen due to expanded gases in their body when brought to the surface of a body of water.

A closely related object is to accomplish the primary object with a simple tool that is easy to use.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 7 is a front elevational view of a first embodiment of the holding case;

FIG. 8 is a rear elevational view of said first embodiment of said holding case;

DETAILED DESCRIPTION OF THE PREFERRED EMBODIMENT

Figure 1:
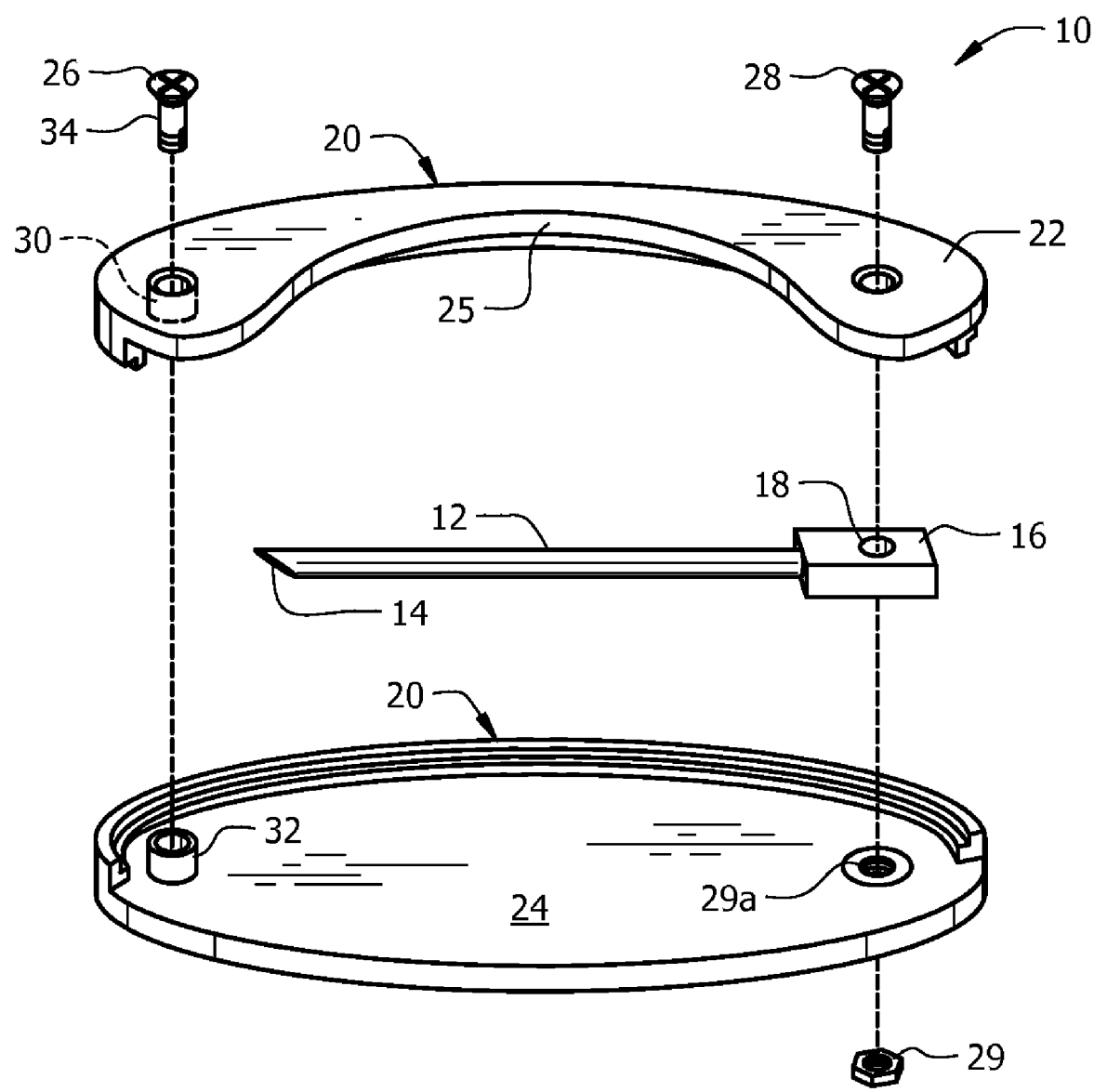
FIG. 1 is an exploded perspective view of the novel structure.

Referring now to FIG. 1, it will there be seen that an illustrative embodiment of the invention is denoted as a whole by the reference numeral 10.

Tool 10 includes a rigid, preferably metallic tube 12 having an external diameter of about an eighth of an inch (0.125☐) and an internal diameter a little more than half that, depending upon the thickness of the metal, hard plastic, or other material of which said tube is made.

Tube 12 is beveled at its distal free end as indicated by the reference numeral 14. The preferred angle of bevel is about thirty five degrees (35°) but such angle is not critical.

No further apparatus is required to perform the step of the novel method, although additional apparatus is disclosed hereinafter to facilitate handling of tube 10.

When a protected fish suffering from pressure-drop-induced swelling is found in a net, the fisherman grasps the non-beveled proximal end of the tube and punctures the fish at a location forwardly of the fish's stomach and rearwardly of its head with the sharp distal free end of the tube. It is important not to puncture the stomach. Air under pressure will flow through the tube and escape from the fish, thereby ending the swelling. The fish's eyes and stomach will quickly return to their respective normal positions when the venting process is complete. When the air has stopped flowing, as indicated by the fish's body returning to an unbloated condition and as indicated by the absence of noise caused by air flowing through the tube, then the tube is withdrawn. The small puncture will close because the leading edge of the bevel is sharp and makes a small cut. The elasticity of the fish's body will cause the opening created by the tube to collapse and the small slit will heal quickly after the fish is released. The well-known practice of reviving the fish by manually propelling it through the water is still practiced after the tube is withdrawn from the body of the fish.

The proximal end of tube 12 is structurally enhanced by ensleeving said proximal end within a longitudinally disposed lumen of base 16, said base being enlarged with respect to tube 12 to reinforce its proximal end. Bore 18 that perpendicularly intersects said lumen is formed in tube 12 and base 16.

Handle 20 is provided in two (2) parts, denoted 22 and 24. Enlarged base 16 facilitates the pivotal attachment of tube 12 to handle 20. However, it is within the scope of this invention to pivotally mount tube 12 to handle 20 in the absence of base 16. In that embodiment, bore 18 is still formed in tube 12 but without the reinforcement provided by base 16.

Handle 20 is preferably made of two molded (2) parts 22 and 24 that are secured to one another by any suitable means. In the preferred embodiment, screws or rivets 26 and 28 are used to fasten together the trailing and leading (proximal and distal) ends, respectively, of handle parts 22, 24. Base 18 is dimensioned so that it can fit between said parts 22, 24.

In this particular embodiment, an unthreaded boss 30 is formed integrally with handle part 22 and an internally threaded boss 32 is formed integrally with handle part 24 so that the two (2) bosses confront and abut one another when the handle parts are connected to one another. An externally threaded screw 34 extends through boss 30 and screwthreadedly engages the internal threads of boss 32 to secure the respective trailing ends of said handle parts together.

Bore 18 is formed in the proximal end of tube 12 and in structure-enhancing base 16 about mid-length of base 16. Externally threaded screw 28 extends through bore 18 in normal relation to a longitudinal axis of tube 12. It engages nut 29 which is received in a countersunk recess 29a formed in a bottom wall of handle part 24. A rivet may replace screw 28 and nut 29. A rivet may also supplant screw 26 and it related parts.

Figure 2:
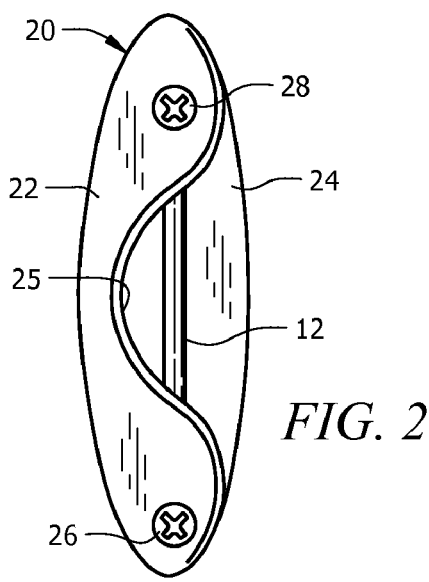
FIG. 2 is a top plan view of the novel structure when the vent tube is in its stored configuration.

Parts 22 and 24 may be generally rectangular or oval; in the depicted embodiment, part 22 is generally oval and a dished area 25 is formed in part 24 to expose the medial part of tube 10 so that it can be grasped by a finger or thumb of a user as best understood in connection with FIG. 2.

Figure 3A:
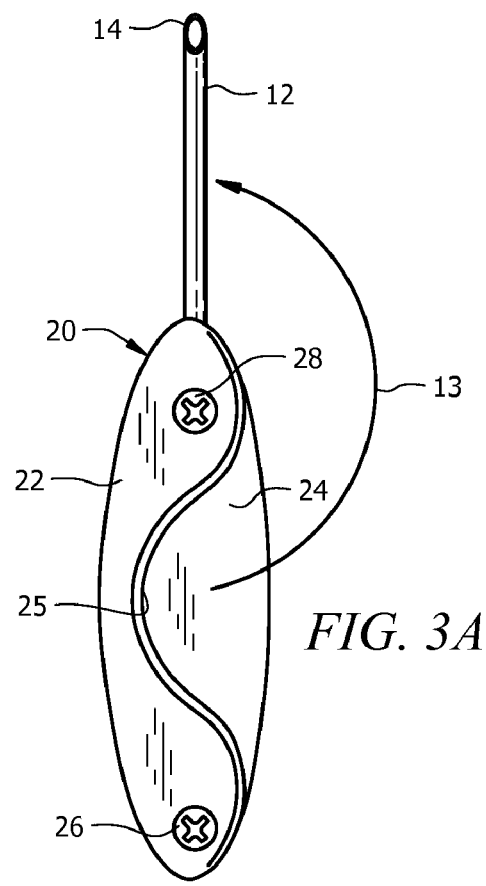
FIG. 3A is a top plan view when the vent tube is deployed.
Figure 3B:
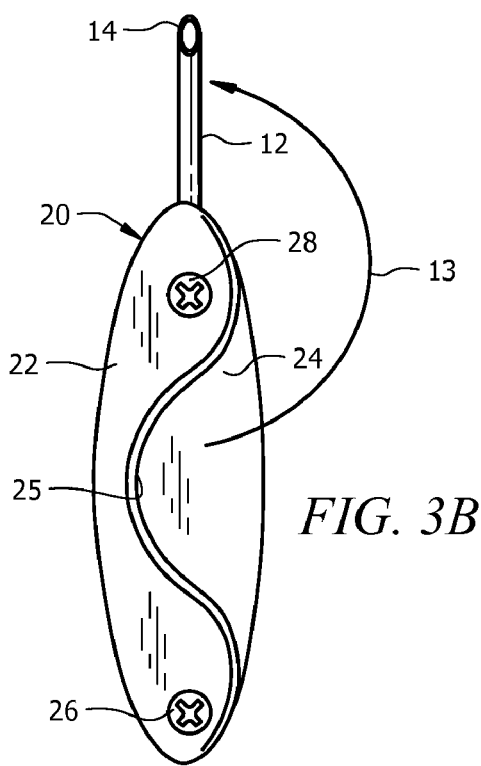
FIG. 3B is a top plan view of an embodiment having a shorter vent tube, for use with small fish.

Directional arrow 13 in FIGS. 3A and 3B indicates how tube 12 is swung about pivot pin 28 from its stored configuration of FIGS. 1 and 2 to its deployed configuration. The shorter vent tube of the FIG. 3B embodiment is used with relatively small fish.

Figure 4:
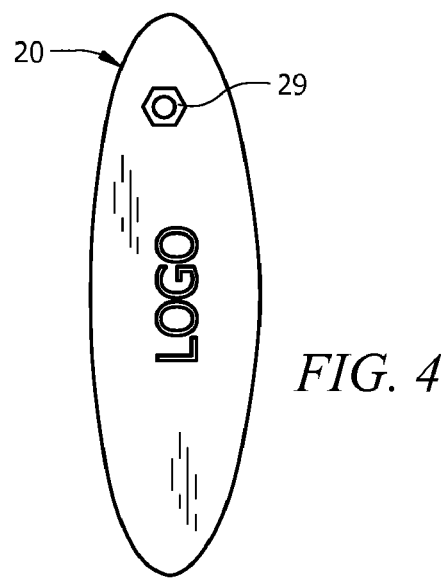
FIG. 4 is a bottom plan view when the vent tube is in its stored configuration.

Advertising material may be provided on the exterior side of handle part 24 is indicated in FIG. 4.

Figure 5:
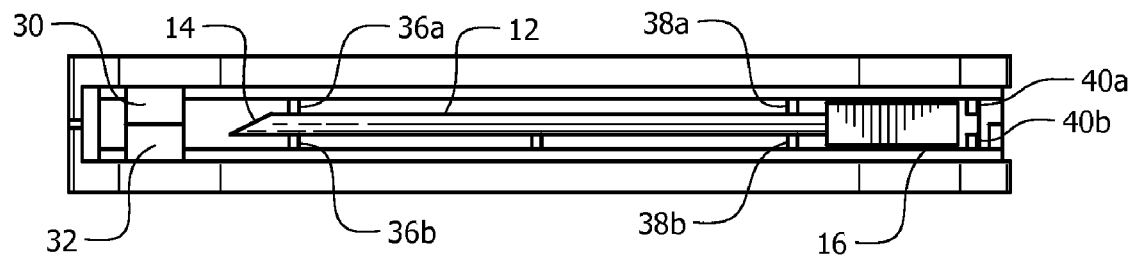
FIG. 5 is a first side elevational view when the vent tube is in its stored configuration.

As best understood in connection with FIG. 5, first detents 36a, 36b, second detents 38a, 38b and third detents 40a, 40b are formed integrally with parts 22, 24. Detents 36a, 36b and 38a, 38b are positioned so that they capture tube 12 when said tube is in its stored configuration as depicted in FIG. 5. Opposed detents 40a, 40b holds tube 10 in its deployed position as depicted in FIG. 3. Where parts 22 and 24 are formed of a hard plastic, said detents are flexible and resilient enough to enable a user to force tube 12 past them when positioning said tube in its deployed or stored configuration. The user can hear a clicking sound as tube 12 passes by the detents into said deployed or stored configuration.

Figure 6:
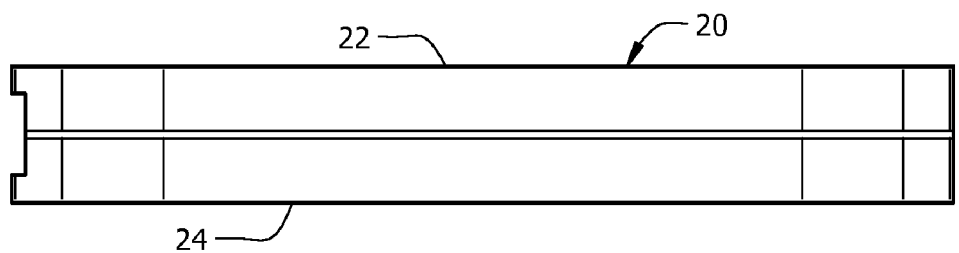
FIG. 6 is a second side view when the vent tube is in its stored configuration.

The bottom side of tool 10 is closed as depicted in FIG. 6.

FIGS. 7 and 8 depict the front and back, respectively, of a carrying case 50 having a pocket 52 formed on a front side thereof. Pocket 52 has an open top end and is sized to hold tool 10 so that part of said tool is exposed so that it can be grasped and removed from said pocket. Alternatively, tool 10 is easily removed by pressing on the bottom of pocket 52 so that tool 10 slides upwardly and out of said pocket. Swivel clip 54 which may be clipped to a belt or any other convenient item of clothing or other mounting place is connected to holder 50 by a suitable strip of material 56.

Figure 9:
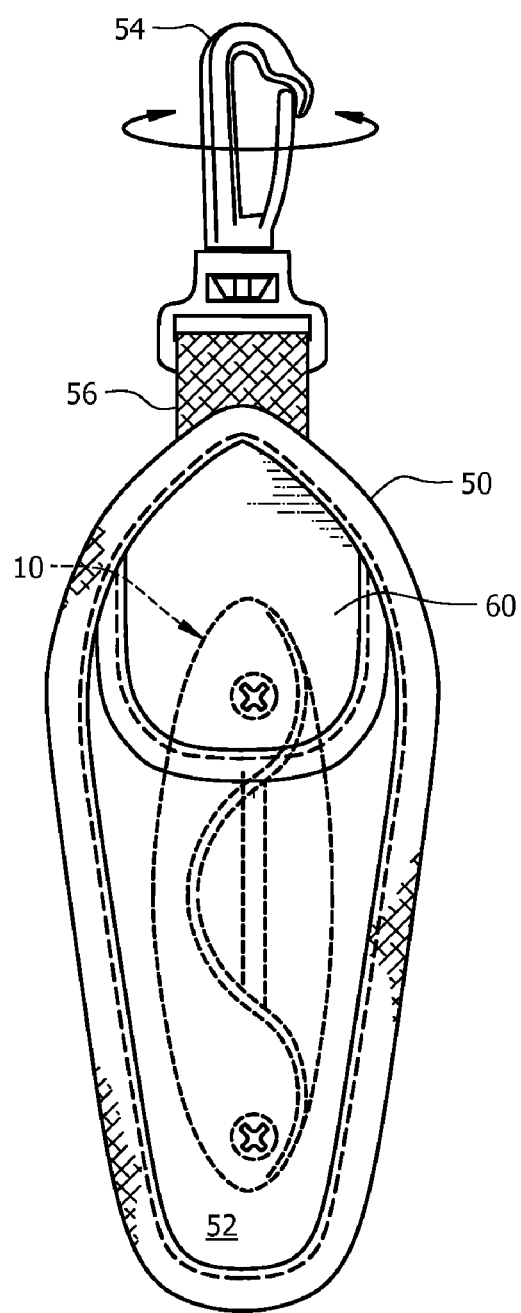
FIG. 9 is a front elevational view of a second embodiment of the holding case, depicting a closed flap.
Figure 10:
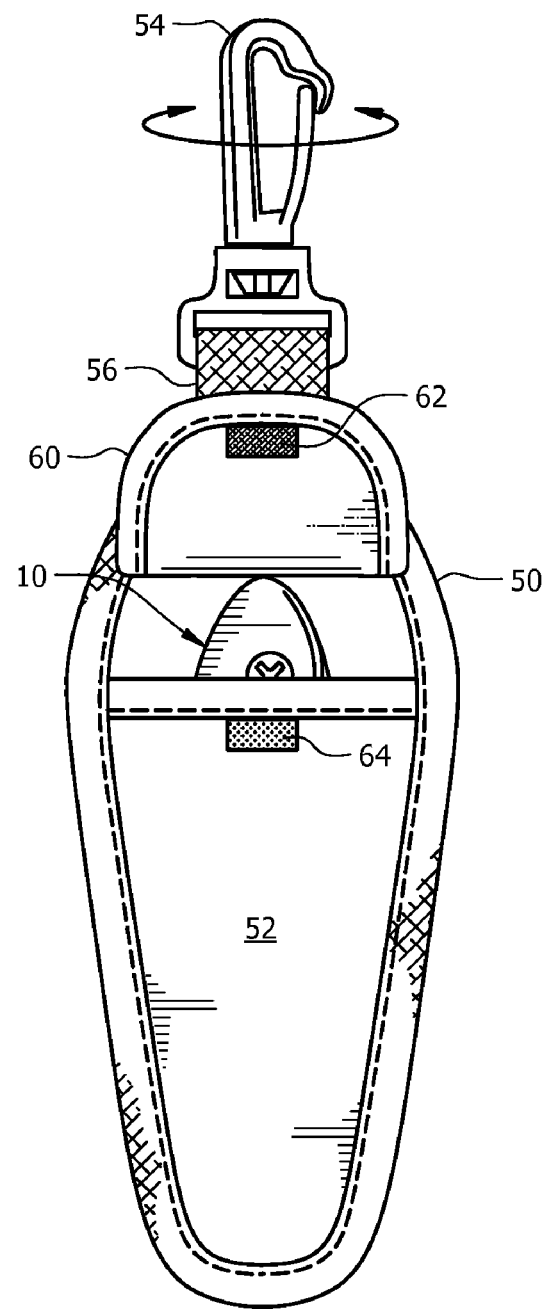
FIG. 10 is a front elevational view of the second embodiment of the holding case, depicting the flap in its open configuration.

FIGS. 9 and 10 depict a second embodiment of carrying case 50. It includes flap 60 which is closed in FIG. 9 and open in FIG. 10. A first hook and loop fastener 62 secured to an underside of flap 60 releasably engages a second, complementary hook and loop fastener 64 secured to an exterior surface of pocket 52 when the flap is closed.

It only takes a few moments to vent a fish using this novel tool. Its use will greatly increase populations of protected fish.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A tool for saving the lives of captured fish that are swollen by expanded gases when brought to the surface, comprising:

an elongate hollow tube of rigid construction having a proximal and a distal end; and a sharp cutting edge formed by a bevel formed in said distal end of said tube;

a handle;

said proximal end of said tube pivotally secured to said handle to facilitate handling of said tube;

said handle including a first part and a second part that confront and abut one another, defining a hollow space between said first part and said second part for receiving said tube when said tube is in a stored configuration;

a pivot pin extending between said first and second parts of said handle at a leading end of said handle;

said tube having a bore formed in said proximal end to receive said pivot pin;

said tube having a deployed position when fully pivoted in a first direction about said pivot pin;

said tube having said stored position when fully pivoted about said pivot pin in a second direction opposite to said first direction;

a detent formed in a leading end of said handle, in leading relation to said pivot pin;

said detent extending into said hollow space between said first and second parts of said handle;

said detent overlying said tube when said tube is in said deployed configuration;

said detent formed of a flexible and resilient material so that said tube transiently displaces said detent formed in said leading end of said handle when said tube is displaced from said deployed configuration to said stored configuration and from said stored configuration to said deployed configuration;

a detent formed in a trailing end of said handle;

said detent formed in said trailing end of said handle extending into said hollow space between said first and second parts of said handle;

said detent formed in said trailing end of said handle overlying said tube when said tube is in said stored configuration;

said detent formed in said trailing end of said handle formed of a flexible and resilient material so that said tube transiently displaces said detent when said tube is displaced from said deployed configuration to said stored configuration and from said stored configuration to said deployed configuration;

whereby a user grasps said proximal end of said tube and punctures a fish at a predetermined location in a body of the fish with the sharp cutting edge formed in the distal end of said tube to allow gases to flow out of the body of said fish until said body returns to a substantially unswollen condition; and whereby said fish is resuscitated after said gases have been vented and before being released.

2. The tool of claim 1, further comprising:

said proximal end of said tube being enlarged in three dimensions with respect to a balance of said tube to structurally reinforce and said proximal end;

said pivot pin extending through said enlarged, structurally reinforced proximal end of said tube.

3. The tool of claim 1, further comprising:

said second part of said handle having a dished area formed therein to expose a medial extent of said tube when said tube is in said stored configuration so that said medial extent of said tube can be grasped by a finger or thumb of a user.

4. The tool of claim 1, further comprising:

an other detent formed in a leading end of said handle, in trailing relation to said pivot pin;

said other detent formed in said leading end of said handle extending into said hollow space between said first and second parts of said handle;

said other detent formed in said leading end of said handle overlying said tube when said tube is in said stored configuration;

said other formed in said leading end of said handle and formed of a flexible and resilient material so that said tube transiently displaces said other detent formed in said leading end of said handle when said tube is displaced from said deployed configuration to said stored configuration and from stored configuration to said deployed configuration.

5. The tool of claim 1, further comprising:

a carrying case for holding said tool when said tube is in said stored configuration.

6. The tool of claim 5, further comprising:

said carrying case including a clip so that said carrying case can be attached to a belt or other item of clothing.

7. The tool of claim 5, further comprising:

said carrying case including a pocket for slideably receiving said tool;

a flap positioned at a top, open end of said pocket;

said flap closing said pocket when said flap is in a first, closed position; and said flap opening said pocket when said flap is in a second, open position.

8. The tool of claim 7, further comprising:

a first hook and loop fastener secured to an underside of said flap;

a second hook and loop fastener, complementary to said first hook and loop fastener, secured to an exterior surface of said pocket;

whereby said flap is releasably secured in said first, closed position when said first hook and loop fastener engages said second hook and loop fastener.

* * * * *